INVENTOR.
HENRY GABRIEL

ATTORNEYS

United States Patent Office 3,843,438
Patented Oct. 22, 1974

3,843,438
ARTICLE LABELING METHOD
Henry Gabriel, Bartlesville, Okla., assignor to
Phillips Petroleum Company
Filed Dec. 9, 1971, Ser. No. 206,356
Int. Cl. B29c 15/00
U.S. Cl. 156—244                     4 Claims

ABSTRACT OF THE DISCLOSURE

A label is placed in due contact with the surface of an article being extruded and then forcibly urged to a preselected depth in the plasticized article. The label and the article are thereafter cooled.

---

It is desirable to provide apparatus and method for labeling or marking for identification purposes an extruded plastic article. Further, it is desirable to provide apparatus and method for labeling an extruded plastic conduit to provide a label that will be maintained with the conduit during severe impact and scouring action on the outer surface of the conduit.

It has been discovered that heretofore utilized labeling apparatus and method has produced a labeled article which, when subjected to harsh abrasive and impacts, caused the label to be separated from the article thereby making identification of the article more difficult. With the large variations in conduit sizing and composition and the necessity to sometimes know the properties of the conduit in order to utilize the correct joining materials, temperatures, etc. for connecting other conduit or articles thereto, it becomes important that the article be easily identifiable after considerable use thereof. When the article is pipe, a protected marking or labeling is important for pipes carrying hazardous fluids.

In summary, this invention resides in an apparatus and method for placing a label into contact with a plasticized surface of an article being extruded, forcibly urging the label to a preselected depth in the plasticized article and cooling the article and imbedded label.

Other aspects, objects, and advantages of the present invention will become apparent from a study of the disclosure, the appended claims, and the drawings.

Figure 1:
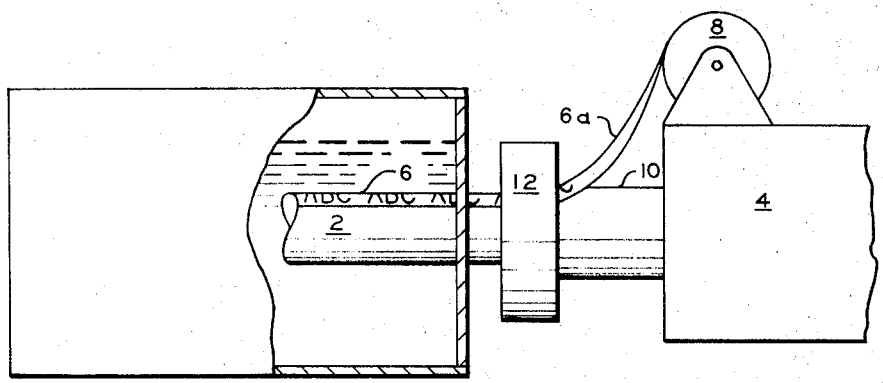
Figure 2:
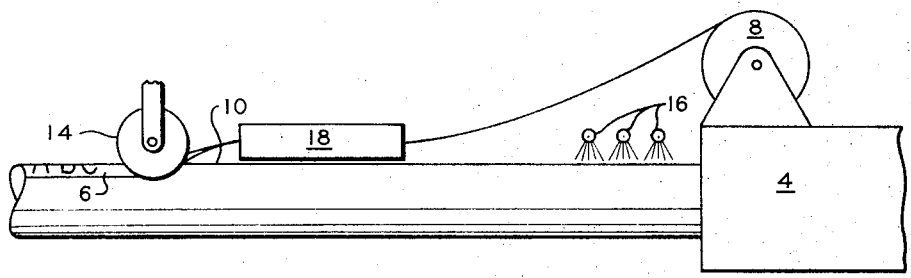
Figure 4:
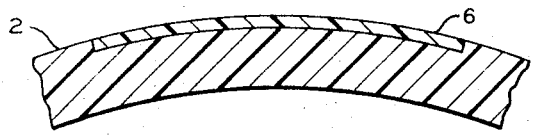
Figure 3:
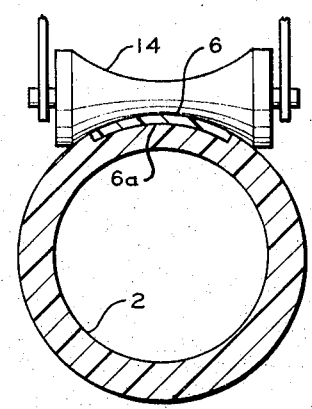
Figure 5:
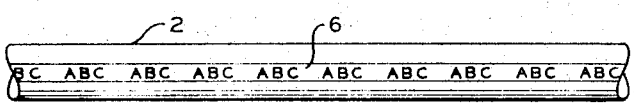

The drawings are diagrammatic views of this invention. FIG. 1 shows the apparatus associated with a screw-type extruder, FIG. 2 shows the embodiment of the apparatus associated with a dynamic extruder, FIG. 3 is an end view of the pipe and roller of FIG. 2 with other portions of the apparatus cut away, FIG. 4 shows a cut section of a conduit and label of this invention and FIG. 5 shows a plan view of a conduit and label of this invention.

Referring to FIG. 1, an article 2, here shown as a hollow conduit or pipe, is being extruded from a die head 4 of a screw-type extruder. The polymerization of the thermoplastic material and extrusion thereof to form articles is known in the art and is not a part of this invention.

The article 2 emerges from the die head 4 in a heated, plasticized, easily deformable condition. While in this condition, a label 6 having labeling information 6a printed on its underside is fed from a label source 8, preferably a continuous reel wound label ribbon, onto a plasticized surface 10 of the article 2 emerging from the extruder die head 4.

The label 6 is preferably formed of thermoplastic material which is the same or like material from which the article 2 is formed in order that the label 6 is compatible with the article 2 and becomes a fused together, unitary, composite structure with the article 2. For example when the article 2 is polyethylene pipe, the label 6 is made from polyethylene film; or when article 2 is polyvinyl chloride, the film 6 is of the same material. The label can be preprinted or printed by an offset printer (not shown) placed between the supply roll and article 2. The label 6 also preferably has a thickness less than about ½ mil. At thicknesses greater than about ½ mil it has been found that the label 6 generally will not be heated by the article 2 to a temperature sufficient to substantially, completely bond or fuse the label 6 to the article 2 and thereby form a fused together, unitary, composite structure.

The label 6 being positioned on and heated by the plasticized article is passed through a sizing ring 12 which forcibly urges the label 6 to a preselected depth in the plasticized surface 10 of the article 2 and causes the plasticized article 2 to be deformed to preselected dimensions. The label 6 can be imbedded into the article 2 at a depth less or greater than its thickness or it can be fused to the surface of the article. In order to assure that the label 6 is fixedly attached to the article 2 while maintaining the article with a smooth outer surface, it is preferred that the label 6 be forced into the article 2 to a depth substantially equal to the thickness of the label.

Referring to FIGS. 2 and 3, a roller 14 is provided for urging the label 6 into imbedment within the article 2. Here the article 2 is being extruded in a substantially solid condition from a dynamic extruder having a water cascade to further cool the extrudate. An oven 18 is a positioned downstream of the water cascade 16 to increase the temperature of at least the portion 10 of the article over which said label 6 is to be placed. The temperature of the article 2 is increased to a temperature at which the article portion 10 is sufficiently plasticized to allow the roller 14 to forcibly urge the label 6 to a preselected depth in the article 2. The label 6 can also be heated by the oven 18 to permit fusion of the label 6 and the article 2 at lower temperatures.

FIG. 4 shows the label 6 imbedded in and fused to the article 2 with the outer surface of the article and label being a smooth continuous surface. As set forth above, this is accomplished by imbedment of the label to a depth substantially equal to the thickness of the label, preferably less than about ½ mil. It is also preferred that the roller 14 have a length greater than the width of the label for assuring the smooth continuous surface.

By so imbedding and fusing the label 6 into or on the surface of the article 2, the label becomes a unitary part of the article as opposed to adhering the label to the article with adhesive material. As shown in FIG. 5, a label can have printing thereon and can extend the length of the article. By having the printing 6a on the underside of label 6 for example, the printing becomes a unitary part of the article with the printing protected by a coat of thermoplastic material equal to the thickness of the label. It should also be understood that the label 6 can be of less length than the article and can be of different coloration than the article.

Other modifications and alterations of this invention will become apparent to those skilled in the art from the foregoing discussion and accompanying drawing, and it should be understood that this invention is not to be unduly limited thereto.

What is claimed is:
1. In the extrusion of a hollow thermoplastic conduit, a method for fixedly attaching a label to said conduit comprising:
   positioning a thermoplastic label on a plasticized surface of said conduit, said label having a thickness less than about one-half mil;
   passing said conduit, with said label positioned on the plasticized surface thereof, through a sizing ring thereby forcing said label to be embedded in said conduit to a depth substantially equal to the thickness of said label and simultaneously deforming said conduit to preselected dimensions;

thereafter cooling said conduit and said label to thereby fuse said conduit and said label one to the other.

2. A method, as set forth in claim 1, wherein said label has printing on a first side thereof, wherein positioning said label on said surface of said conduit is accomplished with said first side of said label in contact with said surface of said conduit, and wherein said label is of the same thermoplastic material as said conduit.

3. A method, as set forth in claim 1, wherein said hollow thermoplastic conduit comprises a pipe.

4. A method, as set forth in claim 3, wherein the thermoplastic material from which said pipe is extruded comprises polyethylene and wherein the material from which said thermoplastic label is formed comprises polyethylene.

References Cited

UNITED STATES PATENTS

| | | | |
|---|---|---|---|
| 2,810,669 | 10/1957 | Heupgen | 156—51 |
| 3,076,235 | 2/1963 | Rollins et al. | 156—303.1 |
| 3,620,880 | 11/1971 | Lemelson | 156—384 |
| 2,316,149 | 4/1943 | Bates | 156—244 |
| 2,392,594 | 1/1946 | Karfiol et al. | 156—244 |
| 3,458,386 | 7/1969 | Shanok et al. | 156—244 |
| 3,532,571 | 10/1970 | Ausnit | 156—500 |

FOREIGN PATENTS

| | | | |
|---|---|---|---|
| 241,041 | 4/1960 | Australia | 156—244 |
| 1,119,327 | 6/1956 | France | 156—244 |

CHARLES E. VAN HON, Primary Examiner

C. WESTON, Assistant Examiner

U.S. Cl. X.R.

156—303.1; 264—173, 209